United States Patent
Choi et al.

(10) Patent No.: US 9,589,561 B2
(45) Date of Patent: Mar. 7, 2017

(54) DISPLAY APPARATUS AND METHOD FOR RECOGNIZING VOICE

(71) Applicant: SAMSUNG ELECTRONICS CO., LTD., Suwon-si, Gyeonggi-do (KR)

(72) Inventors: Chan-hee Choi, Seoul (KR); Kyung-mi Park, Suwon-si (KR); Jae-hyun Bae, Suwon-si (KR); Ki-hoon Shin, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/833,481

(22) Filed: Aug. 24, 2015

(65) Prior Publication Data

US 2016/0063995 A1 Mar. 3, 2016

(30) Foreign Application Priority Data

Aug. 27, 2014 (KR) .................. 10-2014-0112370

(51) Int. Cl.
*G10L 15/01* (2013.01)
*G10L 15/02* (2006.01)
(Continued)

(52) U.S. Cl.
CPC ............ *G10L 15/10* (2013.01); *G06F 3/0482* (2013.01); *G06F 3/167* (2013.01); *G10L 15/22* (2013.01);
(Continued)

(58) Field of Classification Search
CPC ......... G10L 15/26; G10L 15/22; G10L 15/08; G10L 15/187; G10L 15/063; G10L 15/32;
(Continued)

(56) References Cited

U.S. PATENT DOCUMENTS

2002/0173955 A1* 11/2002 Reich .................. G10L 15/22
704/231
2002/0184016 A1* 12/2002 Hartley .................. G10L 15/08
704/235
(Continued)

FOREIGN PATENT DOCUMENTS

EP 2 533 242 12/2012
WO 2006/016308 2/2006

OTHER PUBLICATIONS

Extended Search Report mailed Jan. 18, 2016 in counterpart European Application No. 15182181.6.

*Primary Examiner* — Marivelisse Santiago Cordero
*Assistant Examiner* — Stephen Brinich
(74) *Attorney, Agent, or Firm* — Nixon & Vanderhye, P.C.

(57) ABSTRACT

A display apparatus which is capable of recognizing a voice and a method thereof are provided. The method includes receiving an uttered voice of a user, extracting a plurality of similar words which are similar to the uttered voice by extracting voice information from the uttered voice and measuring reliability of a plurality of words based on the extracted voice information, setting a word satisfying a predetermined condition from among the plurality of extracted similar words as a target word with respect to the uttered voice, and displaying at least one of the target word and a similar word list including similar words other than the target word. In this manner, a display apparatus may improve a recognition rate on an uttered voice of a user without changing an internal component related to voice recognition, such as, an acoustic model, a pronunciation dictionary, or the like.

19 Claims, 9 Drawing Sheets

(51) Int. Cl.
*G10L 15/10* (2006.01)
*G06F 3/0482* (2013.01)
*G06F 3/16* (2006.01)
*G10L 15/22* (2006.01)
*G10L 15/08* (2006.01)
*G10L 15/26* (2006.01)

(52) U.S. Cl.
CPC .............. *G10L 15/08* (2013.01); *G10L 15/26* (2013.01); *G10L 2015/221* (2013.01); *G10L 2015/223* (2013.01); *G10L 2015/226* (2013.01)

(58) Field of Classification Search
CPC ......... G10L 15/00; G10L 15/02; G10L 15/10; G10L 15/18; G10L 15/1815; G10L 2015/0631; G10L 2015/088; G10L 15/183; G10L 15/14; G10L 15/265; G10L 21/06; G10L 15/06; G06F 17/28
USPC ..... 704/1–10, 255, 251, 231, 235, 240, 257, 704/E15.001, E15.008, E15.045, E15.04, 704/275

See application file for complete search history.

(56) References Cited

U.S. PATENT DOCUMENTS

| | | |
|---|---|---|
| 2003/0125945 A1 | 7/2003 | Doyle |
| 2005/0209854 A1* | 9/2005 | Abrego ................. G10L 15/187 704/252 |
| 2006/0074651 A1 | 4/2006 | Arun |
| 2006/0200347 A1 | 9/2006 | Kim et al. |
| 2008/0228486 A1 | 9/2008 | Claiborn et al. |
| 2009/0070109 A1 | 3/2009 | Didcock et al. |
| 2013/0033644 A1 | 2/2013 | Kim et al. |
| 2013/0124550 A1 | 5/2013 | Oel et al. |

* cited by examiner

FIG. 4

| No. | SIMILAR WORD | RELIABILITY VALUE | CRITICAL VALUE | DOMAIN |
|---|---|---|---|---|
| 1 | NDC | 4000 | 4200 | Channel Name |
| 2 | MDC | 3800 | 3600 | Channel Name |
| 3 | ADC | 3200 | 4000 | Channel Name |

| SIMILAR WORD | DOMAIN | CRITICAL VALUE | |
|---|---|---|---|
| NDC | Channel Name | 4200→4000 | ~610 |
| MDC | Channel Name | 3600→3800 | ~620 |
| ADC | Channel Name | 4000 | |

DISPLAY APPARATUS AND METHOD FOR RECOGNIZING VOICE

CROSS-REFERENCE TO RELATED APPLICATION

This application is based on and claims priority under 35 U.S.C. §119 to Korean Patent Application No. 10-2014-0112370, filed on Aug. 27, 2014 in the Korean Intellectual Property Office, the disclosure of which is incorporated by reference herein in its entirety.

BACKGROUND

1. Field

The disclosure generally relates to a display apparatus and a method thereof, and for example, to a display apparatus which is capable of recognizing an uttered voice of a user and a method thereof.

2. Description of Related Art

Generally, in response to a user's uttered voice being received, a voice-recognizable display apparatus compares the received uttered voice with a plurality of pre-registered words and sets a word having high reliability as an execution command with respect to the user's uttered voice.

However, in this case, when there are a plurality of similar words which are similar to the user's uttered voice, a similar word which does not meet an intention of the user may be set as an execution command with respect to the user's uttered voice.

In the related art for resolving such problem, a method for recognizing a voice includes assigning a critical value to each of a plurality of pre-registered words and setting a word having a reliability value higher than the critical values of the plurality of pre-registered words as an execution command. However, such method has a problem in which an execution command is set based on a user's uttered voice, and thus, when there are a plurality of similar words which are similar to the user's uttered voice, a particular similar word is set as the execution command.

Another method for recognizing a voice in the related art includes providing a plurality of similar words which are similar to a user's uttered voice in a form of a list and setting a similar word selected by the user as an execution command. However, when there are a plurality of similar words which are similar to the uttered voice, this method provides a list of the plurality of similar words, and thus, lacks a practical use in terms of convenience of controlling an operation of a display apparatus through a user's uttered voice.

SUMMARY

The disclosure has been provided to address the aforementioned and other problems and disadvantages occurring in the related art, and an aspect of the disclosure provides a display apparatus for enhancing a recognition rate on an uttered voice of a user.

According to an example embodiment, a method for performing voice recognition on an uttered voice of a user in a display apparatus is provided, the method including: receiving an uttered voice of a user, extracting a plurality of similar words which are similar to the uttered voice by extracting voice information from the uttered voice and measuring reliability on a plurality of words based on the extracted voice information, setting a word satisfying a predetermined condition from among the plurality of extracted similar words as a target word with respect to the uttered voice, and displaying at least one of the target word and a similar word list including similar words other than the target word.

The voice information may be pronunciation information on text converted through voice recognition on the uttered voice.

Extracting the plurality of similar words may include extracting a plurality of similar words which are similar to the uttered voice based on a reliability value calculated from similarity between a pronunciation defined for each of the plurality of words and a pronunciation with respect to the uttered voice. In addition, setting the word satisfying the predetermined condition may include comparing a reliability value determined for each of the plurality of similar words and a critical value assigned to each of the similar words and setting a similar word having a reliability value higher than the critical value assigned to each of the similar words as a target word with respect to the uttered voice.

The method may further include setting an execution command. In response to an execution command of the user not being received for a predetermined critical time or in response to a selection command with respect to the target word being received, setting the execution command may include setting the target word as an execution command, and in response to a selection command with respect to the similar word list being received, setting a similar word corresponding to the selection command as an execution command.

The similar word list may be a list including other similar words than the target word and different symbolic letters being matched with the other similar words. In response to the selection command being an uttered voice related to a symbolic letter, setting the execution command may include setting a similar word which is matched with a symbolic letter similar to the uttered voice from among the similar words in the similar word list as an execution command.

The method may further include adjusting a critical value assigned to the similar word set as the execution command from among the plurality of similar words including the target word.

In response to the target word being set as an execution command, adjusting the critical value may include decreasing a critical value of the similar word set as the target word by a predetermined adjustment value.

In response to a similar word included in the similar word list being set as an execution word, adjusting the critical value may include decreasing a critical value of the similar word set as the execution command by a first adjustment value and increasing a critical value of the similar word set as the target word by a second adjustment value.

In response to the plurality of similar words which are similar to the uttered voice being extracted, extracting the plurality of similar words may include grouping the plurality of extracted similar words into a similar word group.

In response to the similar words extracted in connection with the uttered voice being grouped into a similar word group, extracting the plurality of similar words may include extracting all words in the similar word group as a similar word related to the uttered voice.

According to an example embodiment, a display apparatus is provided including: an input circuit configured to receive an uttered voice of a user, a display configured to display a voice recognition result based on the uttered voice, a voice processor configured to extract a plurality of similar words which are similar to the uttered voice by extracting voice information from the uttered voice and measuring reliability on a plurality of words based on the extracted voice information, and a controller configured to set a word satisfying a predetermined condition from among the plurality of extracted similar words as a target word with respect to the uttered voice and to control the display to display at least one of the target word and a similar word list including similar words other than the target word.

The voice information may be pronunciation information on text converted through voice recognition on the uttered voice.

The voice processor may be configured to extract a plurality of similar words which are similar to the uttered voice based on a reliability value determined from similarity between a pronunciation defined for each of the plurality of words and a pronunciation with respect to the uttered voice. In addition, the controller may be configured to compare a reliability value determined for each of the plurality of similar words and a critical value assigned to each of the similar words and set a similar word having a reliability value higher than the critical value assigned to each of the similar words as a target word with respect to the uttered voice.

In response to an execution command of the user not being received for a predetermined critical time or in response to a selection command with respect to the target word being received, the controller may be configured to set the target word as an execution command, and in response to a selection command with respect to the similar word list being received, may set a similar word corresponding to the selection command as an execution command.

The similar word list may be a list including other similar words than the target word and different symbolic letters being matched with the other similar words. In response to the selection command being an uttered voice related to a symbolic letter, the controller may be configured to set a similar word which is matched with a symbolic letter similar to the uttered voice from among the similar words in the similar word list as an execution command.

The controller may be configured to adjust a critical value assigned to the similar word set as the execution command from among the plurality of similar words including the target word.

In response to the target word being set as an execution command, the controller may be configured to decrease a critical value of the similar word set as the target word by a predetermined adjustment value.

In response to a similar word included in the similar word list being set as an execution word, the controller may be configured to decrease a critical value of the similar word set as the execution command by a first adjustment value and may increase a critical value of the similar word set as the target word by a second adjustment value.

In response to the plurality of similar words which are similar to the uttered voice being extracted, the controller may be configured to group the plurality of extracted similar words into a similar word group.

In response to the similar words extracted in connection with the uttered voice being grouped into a similar word group, the voice processor may be configured to extract all words in the similar word group as a similar word related to the uttered voice.

According to above described various example embodiments, a display apparatus may improve a recognition rate on an uttered voice of a user without changing an internal component related to voice recognition, such as, for example, an acoustic model, a pronunciation dictionary, etc.

BRIEF DESCRIPTION OF THE DRAWINGS

The above and/or other aspects and advantages of the disclosure will become more apparent from the following detailed description taken in conjunction with the accompanying drawings, in which like reference numerals refer to like elements, and wherein:

FIG. 4 is a demonstration diagram illustrating an operation of setting a target word in a display apparatus according to an example embodiment;

FIG. 6 is a demonstration diagram illustrating an operation of adjusting a critical value of a similar word which is similar to a user's uttered voice in a display apparatus according to an example embodiment;

DETAILED DESCRIPTION

Figure 1:
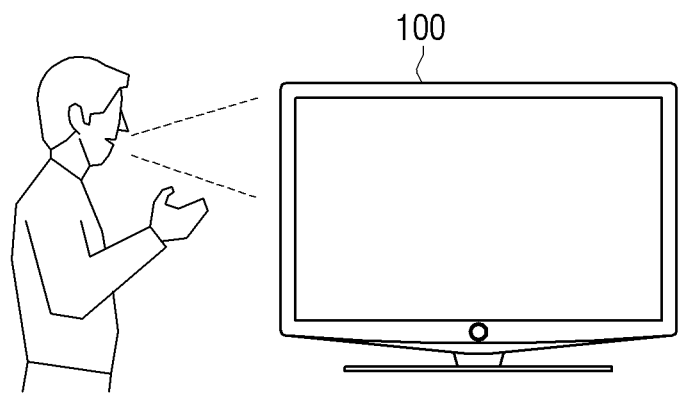
FIG. 1 is the first demonstration diagram illustrating an interactive system which provides response information corresponding to a user's uttered voice according to an example embodiment.

The example embodiments of the disclosure may be diversely modified. Accordingly, example embodiments are illustrated in the drawings and are described in detail in the detailed description. However, it is to be understood that the disclosure is not limited to a specific example embodiment, but includes all modifications, equivalents, and substitutions without departing from the scope and spirit of the disclosure. Also, well-known functions or constructions are not described in detail since they might obscure the disclosure with unnecessary detail.

Certain example embodiments are described in detail below with reference to the accompanying drawings.

In the following description, like drawing reference numerals are used for the like elements, even in different drawings. The matters defined in the description, such as detailed construction and elements, are provided to assist in understanding of the example embodiments. However, example embodiments can be practiced without those specifically defined matters. Also, well-known functions or constructions are not described in detail since they might obscure the application with unnecessary detail.

Figure 2:
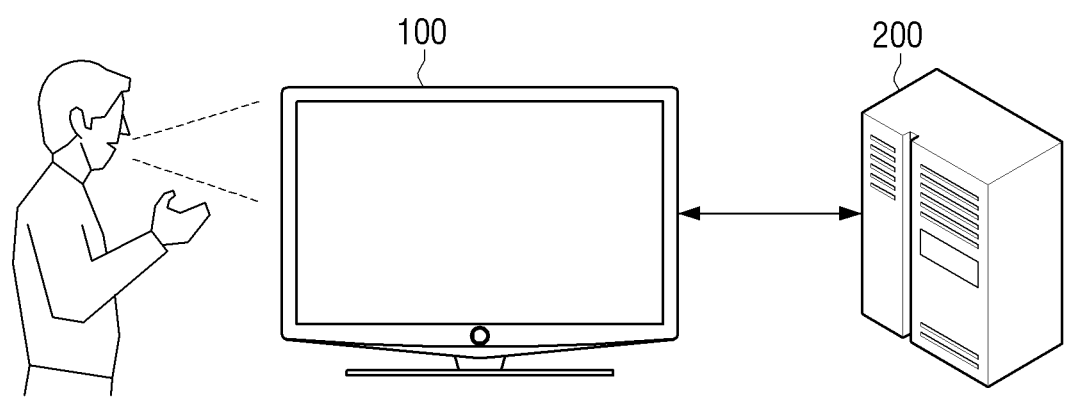
FIG. 2 is the second demonstration diagram illustrating an interactive system which provides response information corresponding to a user's uttered voice according to an example embodiment.

FIG. 1 is a first demonstration diagram illustrating an interactive system which provides response information corresponding to a user's uttered voice according to an example embodiment, and FIG. 2 is a second demonstration diagram illustrating an interactive system which provides response information corresponding to a user's uttered voice according to an example embodiment.

As illustrated in FIG. 1, a display apparatus 100 having an interactive system may be an apparatus in which internet access is available and may be realized as diverse electronic apparatuses such as, for example, a smart television (TV), a mobile phone including a smart phone, a desktop personal computer (PC), a laptop PC, a navigation apparatus, etc. In response to a user's uttered voice being received, the display apparatus 100 is configured to perform an operation corresponding to the received uttered voice. For example, in response to the user's uttered voice being received, the display apparatus 100 may, for example, convert a voice signal regarding the received uttered voice into text. According to an example embodiment, the display apparatus 100 may, for example, convert a voice signal regarding a user's uttered voice into text by using a speech to text (STT) algorithm.

The display apparatus 100 compares a pronunciation of the text converted from the user's uttered voice with a pronunciation of each of a plurality of pre-registered words and measures reliability with respect to the plurality of words. Subsequently, the display apparatus 100 extracts a plurality of similar words which are similar to the user's uttered voice based on the measured reliability.

The display apparatus 100 sets a similar word which satisfies a predetermined condition from among the plurality of extracted similar words as a target word with respect to the user's uttered voice and displays the target word and a similar word list including the other similar words in a form of a user interface (UI).

For example, in response to three similar words being extracted in connection with the user's uttered voice, the display apparatus 100 compares a reliability value of each of the three similar words with a critical value assigned to each of the three similar words and sets a similar word having a reliability value higher than the critical value as a target word. In addition, the display apparatus 100 generates a similar word list regarding the two similar words other than the similar word set as the target word and displays the similar word list in a screen in a form of a UI.

In response to a selection command with respect to the target word being received or in response to a selection command not being received from a user for a predetermined time while the target word and the similar word list are displayed, the display apparatus 100 sets the target word as an execution command with respect to the user's uttered voice. Subsequently, the display apparatus 100 may control an operation of the display apparatus 100 or receive and display a content from a web server (not shown) based on the target word set as the execution command.

Meanwhile, in response to a selection command with respect to at least one similar word included in the similar word list being received, the display apparatus 100 sets a similar word corresponding to the received selection command as an execution command with respect to the user's uttered voice. Subsequently, the display apparatus 100 may control an operation of the display apparatus 100 or receive and display a content from a web server (not shown) based on the similar word set as the execution command.

As described above, according to an example embodiment, the display apparatus 100 may provide a plurality of similar words which are difficult to distinguish from the user's uttered voice and may execute control based on a similar word having high frequency of use to be executed by priority. Accordingly, the display apparatus 100 may reduce and/or minimize an error of a voice recognition result on an execution command that the user intended.

Meanwhile, in response to the execution command with respect to the user's uttered voice being set, the display apparatus 100 may adjust a critical value of the similar word set as the execution command. For example, in response to the similar word set as the target word or at least one of the similar words in the similar word list being set as the execution command, the display apparatus 100 decreases the critical value of the similar word set as the execution command by a predetermined value.

Accordingly, the display apparatus 100 may set a target word with respect to the user's uttered voice by using the adjusted critical value of each of the similar words in a voice recognition process, thereby improving a voice recognition rate on the user's uttered voice.

As illustrated in FIG. 2, an interactive system may, for example, include the display apparatus 100 and a voice recognition apparatus 200. In this case, the display apparatus 100 receives an input of the user's uttered voice and transmits a voice signal with respect to the received uttered voice to the voice recognition apparatus 200. The voice recognition apparatus 200 converts the voice signal with respect to the user's uttered voice received from the display apparatus 100 into, for example, text and compares a pronunciation of the converted text with a pronunciation of each of the plurality of pre-registered words to measure the reliability of the plurality of words. Subsequently, the voice recognition apparatus 200 extracts a plurality of similar words which are similar to the user's uttered voice based on the measured reliability. The voice recognition apparatus 200 sets a similar word which satisfies a predetermined condition from among the plurality of extracted similar words as the target word with respect to the user's uttered voice and transmits voice recognition result information including the target word and the other similar words to the display apparatus 100.

The display apparatus 100 displays the target word and a similar word list including the other similar words in a form of a UI by using the voice recognition result information received from the voice recognition apparatus 200. In response to a selection command with respect to one of the similar words being set as the target word and the similar words in the similar word list being received, the display apparatus 100 may be configured to control the operation of the display apparatus 100 or receive and display a content from a web server (not shown) based on the received selection command.

In response to the execution command with respect to the user's uttered voice being set, the display apparatus 100 transmits execution information on the similar word set as the execution command to the voice recognition apparatus 200. The voice recognition apparatus 200 may, for example, decrease the critical value of the similar word set as the execution command by a predetermined value based on the received execution information.

The voice recognition apparatus 200 may set the target word with respect to the user's uttered voice using the adjusted critical value of each of the similar words in the voice recognition process, thereby improving the voice recognition rate on the user's uttered voice.

As above, the interactive system according to an example embodiment has been described schematically.

Components of the display apparatus 100 according to an example embodiment will be described in detail below.

Figure 3:
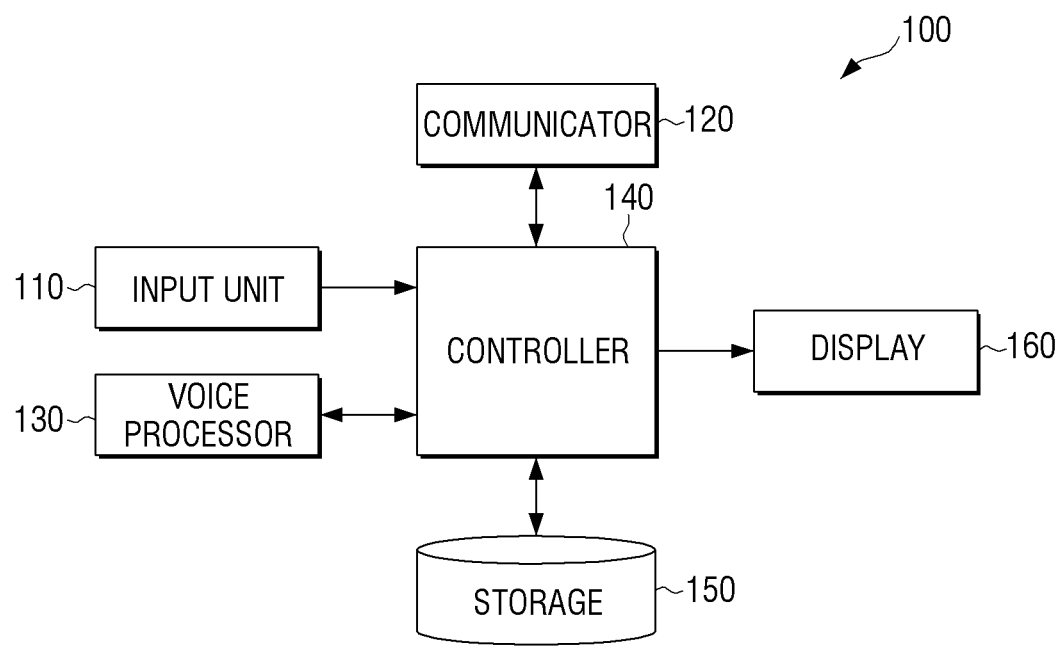
FIG. 3 is a block diagram illustrating a display apparatus according to an example embodiment.

FIG. 3 is a block diagram illustrating a display apparatus according to an example embodiment.

Referring to FIG. 3, the display apparatus 100 includes an input unit 110, a communicator 120, a voice processor 130, a controller 140, a storage 150, and a display 160.

The input unit 110 in the form of input circuitry, such as, for example, a microphone, receives an input of a user's uttered voice. For example, in response to a user's uttered voice in an analogue form being received through, for example, a microphone, the input unit 110 samples the received uttered voice and converts the uttered voice into a digital signal. In this case, when the received uttered voice includes noise due to a factor in a surrounding environment, it is preferred to remove the noise and then convert the user's uttered voice into a digital signal. In addition, the input unit 110 may receive diverse user manipulations and transmit the received user manipulations to the controller 140. In this case, the input unit 110 may receive a user manipulation command through a touch pad, a key pad including various function keys, number keys, special keys, letter key, etc., touch screen, or the like.

The communicator 120, such as, for example, communication circuitry, performs data communication with a remote controller (not shown) which controls the display apparatus 100 or a web server (not shown). For example, the communicator 120 may receive a control signal for controlling the display apparatus 100 or a voice signal regarding a user's uttered voice input in the remote controller (not shown) from the remote controller (not shown). In addition, the communicator 120 may receive content that the user requested by performing data communication with the web server (not shown). In addition, as illustrated in connection with FIG. 2, in response to the voice recognition on the user's uttered voice being performed through the voice recognition apparatus 200, the communicator 120 may transmit the voice signal regarding the user's uttered voice, input through the input unit 110 or received through the remote controller (not shown), to the voice recognition apparatus 200 and receive a voice recognition result on the user's uttered voice from the voice recognition apparatus 200.

The communicator 120 may include various communication modules or circuitry, such as a local area wireless communication module (not shown), a wireless communication module (not shown), etc. In this case, the local area wireless communication module (not shown) may, for example, be a communication module which performs wireless communication with an interactive server 200 located in a close range and an external server (not shown) which provides a content. For example, the local area wireless communication module (not shown) may be Bluetooth, Zigbee, etc. The wireless communication module (not shown) may, for example, be a module which is connected to an external network and performs communication according to a wireless communication protocol such as Wireless-Fidelity (Wi-Fi), Institute of electrical and electronics engineers (IEEE), etc. In addition, the wireless communication module (not shown) may further include a mobile communication module which access a mobile communication network and performs communication according to diverse mobile communication standards such as 3rd Generation (3G), 3rd Generation Partnership Project (3GPP), Long Term Evolution (LTE), etc.

The voice processor 130 is configured to perform voice recognition on a user's uttered voice input through the input unit 110 or received from the remote controller (not shown) through the communicator 120 and to extract voice information. The voice processor 130 is configured to measure the reliability with respect to a plurality of pre-registered words in the storage 150 based on the extracted voice information and extracts a plurality of similar words which are similar to the user's uttered voice. In this case, the voice information may, for example, be pronunciation information of the text converted through the voice recognition on the user's uttered voice.

According to an example embodiment, the voice processor 130 may be configured to convert the user's uttered voice into text by using an STT algorithm. For example, in response to an uttered voice "Volume up!" being received, the input unit 110 converts the uttered voice "Volume up!" into a voice signal in, for example, a digital form. In response to the uttered voice being converted into the voice signal, the voice processor 130 converts the voice signal regarding the uttered voice "Volume up!" into text.

Subsequently, the voice processor 130 extracts a pronunciation from the text on the user's uttered voice. In response to the pronunciation being extracted from the text on the user's uttered voice, the voice processor 130 measures the similarity between a pronunciation defined for each of the plurality of pre-registered words and the pronunciation with respect to the user's uttered voice and determines, for example, by calculating, a reliability value according to the measured similarity. According to an example embodiment, the voice processor 130 may measure the similarity between the pronunciation with respect to the user's uttered voice and the pronunciation defined for each of the plurality of pre-registered words and determine the reliability value by using a similarity algorithm such as, for example, a Confusion Matrix.

In response to the reliability value for each of the plurality of words being determined, the voice processor 130 may be configured to extract a plurality of similar words which are similar to the user's uttered voice based on the determined reliability value. According to an example embodiment, in response to the reliability value for each of the plurality of words, the voice processor 130 may be configured to extract words in a predetermined order as a plurality of similar words which are similar to the user's uttered voice, from a word having the highest reliability value. According to another example embodiment, in response to the reliability values of the plurality of words, the voice processor 130 may be configured to extract a word having a reliability value higher than a predetermined reference value from among the plurality of words as a plurality of similar words which are similar to the user's uttered voice.

In addition, in response to the similar words which are similar to the user's uttered voice being extracted based on the reliability value of each of the plurality of words, the voice processor 130 may determine whether the extracted similar words are grouped into a similar word group. In response to determining that the extracted similar words are grouped into a particular similar word group, the voice processor 130 may extract the other words in the similar word group as a similar word.

The controller 140 may be configured to control overall operations of the components of the display apparatus 100. For example, in response to a plurality of similar words which are similar to the user's uttered voice being extracted through the voice processor 130, the controller 140 may be configured to determine whether the plurality of extracted similar words are pre-stored as a similar word group. In response to determining that the plurality of extracted similar words are not grouped into the same similar word group, the controller 140 may be configured to group the plurality of similar words extracted in connection with the user's uttered voice into the same similar word group and store the similar word group in the storage 150. As described above, in response to the similar words which are similar to the user's uttered voice being extracted, the voice processor 130 may extract the other words which are grouped into the same similar word group as the extracted similar words as a similar word.

Meanwhile, the controller 140 may be configured to set a similar word which satisfies a predetermined condition from among the plurality of similar words extracted in connection with the user's uttered voice as a target word. Subsequently, the controller 140 is configured to control the display 160 to display at least one of the similar words set as the target word and a similar word list including the similar words other than the similar word set as the target word. The display 160 which displays a voice recognition result on the user's uttered voice may display the similar word set as the target word and the similar word list in a screen in a UI form according to a control command of the controller 140.

For example, in response to the plurality of similar words which are similar to the user's uttered voice being extracted, the controller 140 may be configured to compare a reliability value of each of the plurality of extracted similar words with a critical value assigned to each of the plurality of similar words and sets a similar word having a reliability value higher than the critical value from among the plurality of extracted similar words as a target word which is the most similar to the user's uttered voice.

For example, in connection with an uttered voice "fitness," a first similar word "fitness" which is the same as the uttered voice and a second similar word "business" may be extracted from a plurality of pre-registered words. The pronunciation of the uttered voice "fitness" and the pronunciation of the first similar word may be '[#p{i.t{u-.ni.su#],' and the pronunciation of the second similar word "business" may be '[#pi.j-u-.ni.s'u-#].' In addition, the reliability value of the first similar word regarding the uttered voice "fitness" may be 100, the reliability value of the second similar word "business" may be 80, and the critical value assigned to the first and second similar words may be set to be 90. In this case, the controller 140 may be configured to determine that the reliability value of the first similar word out of the first similar word and the second similar word which are similar to the uttered voice "fitness" is higher than the critical value assigned to the first similar word and set the first similar word as a target word with respect to the user's uttered voice.

As described above, in response to the target word with respect to the user's uttered voice being set, the display 160 may display a similar word list including the similar word set as the target word and the other similar words in a form of a UI. In this case, the similar word list is a list including the similar words other than the similar word set as the target word from among the plurality of similar words extracted in connection with the user's uttered voice and different symbolic letters being matched with the other similar words.

While the target word and the similar word list are displayed, the controller 140 may be configured to set the target word or at least one similar word included in the similar word list as an execution command based on a selection command of the user.

According to an example embodiment, in response to an execution command of the user not being input through the input unit 110 for a predetermined critical time or in response to a selection command with respect to a target word being received, the controller 140 may be configured to set the target word as an execution command. Meanwhile, in response to the selection command input from the user being a selection command with respect to the similar word list, the controller 140 may set a similar word corresponding to the selection command inputted from the user from among a plurality of similar words included in the similar word list as an execution command. In this case, the selection command may be a user manipulation command through a touch pad, a keypad, a touch screen or the like, or may be a user's uttered voice.

Meanwhile, as described above, the similar word list may include at least one similar word which is similar to the user's uttered voice and a symbolic letter being matched with the similar word. In response to a similar word included in the similar word list being selected through an uttered voice, the user is able to perform utterance with respect to the symbolic letter matched with the similar word that the user wishes to select. In response to the selection command input through the input unit 110 being an uttered voice regarding a symbolic letter, the controller 140 may, for example, be configured to set a similar word matched with a symbolic letter similar to the user's uttered voice from among the similar words in the similar word list as the execution command. The display apparatus 100 may reduce and/or minimize a recognition error with respect to the selection command regarding the similar word included in the similar word list.

As described above, in response to the target word or a similar word included in the similar word list being set as an execution command, the controller 140 may be configured to perform a control operation, such as, channel change, volume control, etc., or receive and display a content from a web server (not shown) based on the execution command.

In response to the execution command being set from among the plurality of similar words including the target word, the controller 140 may be configured to adjust a critical value assigned to the similar word set as the execution word. According to an example embodiment, in response to the target word being set as the execution command, the controller 140 may be configured to decrease the critical value of the similar word set as the target word by a predetermined adjustment value. Meanwhile, in response to the similar word included in the similar word list being set as the execution command, the controller 140 may be configured to decrease the critical value of the similar word set as the execution word by a first predetermined adjustment value and increase the critical value of the similar word set as the target word by a second predetermined adjustment value.

As described above, according to an example embodiment, the display apparatus 100 may set the target word with respect to the user's uttered voice using the adjusted critical value of each of the similar words in the voice recognition process, thereby improving the voice recognition rate on the user's uttered voice.

FIG. 4 is a demonstration diagram illustrating an operation of determining a target word in a display apparatus according to an example embodiment.

As illustrated in FIG. 4, in response to an uttered voice "Show me MDC!" being received from a user, for example, three similar words "NDC," "MDC," and "ADC" which are similar to the received uttered voice may be extracted, and a reliability value of each of the similar words "NDC," "MDC," and "ADC" may be determined.

In response to the three similar words which are similar to the user's uttered voice and the reliability values of the similar words being obtained, the controller 140 may be configured to compare the reliability value of each of the similar words with the critical value assigned to each of the similar words and sets a similar word having a reliability value higher than the critical value as a target word with respect to the user's uttered voice.

As illustrated in FIG. 4, the reliability value of the first similar word "NDC" is 4000, and the critical value of the first similar word may be set to 4200. The reliability value of the second similar word "MDC" is 3800, and the critical value of the second similar word may be set to 3600. In addition, the reliability value of the third similar word "ADC" is 3200, and the critical value of the third similar word may be set to 4000. The controller 140 may be configured to compare the reliability values of the first to third similar words with the critical values of the first to third similar words. In response to determining that the reliability value of the second similar word "MDC" 410 is higher than a predetermined critical value, the controller 140 may be configured to set the second similar word "MDC" 410 as the target word with respect to the user's uttered voice.

In response to the target word with respect to the user's uttered voice being set, the display 160 displays the second similar word 410 set as the target word and the similar word list including the first similar word and the third similar word in a screen.

Figures 5A, 5B:
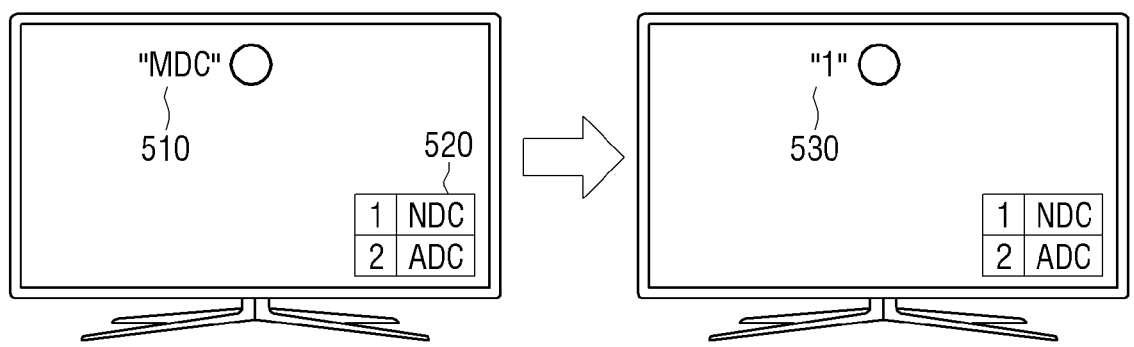
FIGS. 5A-5B are demonstration diagrams illustrating an operation of displaying a voice recognition result on a user's uttered voice in a display apparatus according to an example embodiment.

FIGS. 5A-5B are demonstration diagrams illustrating an operation of displaying a voice recognition result on a user's uttered voice in a display apparatus according to an example embodiment.

As described above in connection with FIG. 4, in response to the second similar word "MDC" being set as the target word, the display apparatus 100 displays a target word 510 and a similar word list 520 in a screen as illustrated in FIG. 5A. The display apparatus 100 displays the second similar word "MDC", that is, the target word 510, in an upper part of the screen and displays the similar word list 520 including the first similar word "NDC" and the third similar word "ADC" in a certain area in a lower part of the screen. In this case, the display apparatus 100 may display the similar word list 520 in which the first similar word "NDC" and the third similar word "ADC" are matched with the symbolic letters, for example, "1" and "2," respectively.

In response to the execution command not being input from the user for a predetermined critical time or in response to the selection command with respect to the target word 510 being received while the target word 510 and the similar word list 520 are displayed, the display apparatus 100 performs a channel change from a currently tuned channel to an "MDC" channel based on the second similar word set as the target word 510.

Meanwhile, the user may intend to change the channel to "NDC," not "MDC." In this case, the display apparatus 100 may receive a selection command with respect to one of the first and third similar words included in the similar word list 520. In this case, the selection command may be a user manipulation command or an uttered voice. In the example embodiment, it is assumed that the selection command is an uttered voice. In response to the selection command regarding an uttered voice with respect to one of the first to third similar words included in the similar word list 520 being received, the display apparatus 100 may recognize the received uttered voice and determine whether the user intended to select the first similar word or intended to select the third word included in the similar word list 520.

As described above, the first similar word "NDC" and the third similar word "ADC" included in the similar word list 520 may be matched with the symbolic letters "1" and "2," respectively. The user is able to perform the utterance with respect to the symbolic letters matched with the first and third similar words in order to change the channel to a channel corresponding to at least one of the first to third similar words. For example, in order to change the channel to a "NDC" channel corresponding to the first similar word, the user is able to perform the utterance with respect to the symbolic letter "1" matched with the first similar word. In response to the user's uttered voice based on the utterance being received, the display apparatus 100 may recognize the received uttered voice and determine that the user's uttered voice is a selection command with respect to the symbolic letter "1." Subsequently, as illustrated in FIG. 5B, the display apparatus 100 displays a voice recognition result "1" 530 in an area in which the second similar word "MDC", that is, the target word 510 is displayed. In addition, the display apparatus 100 changes the current channel to the "NDC" channel based on the first similar word matched with the symbolic letter "1."

As described above, according to an example embodiment, the display apparatus 100 may receive a user's uttered voice with respect to the symbolic letters which are respectively matched with the plurality of similar words included in the similar word list 520, thereby improving the recognition rate on the similar word that the user intended from among the plurality of similar words included in the similar word list 520.

FIG. 6 is a demonstration diagram illustrating an operation of adjusting a critical value of a similar word which is similar to a user's uttered voice in a display apparatus according to an example embodiment.

As described above in connection with FIGS. 5A-5B, the user is able to select the first similar word "NDC" from among the first to third similar words included in the similar word list 520. In this case, the display apparatus 100 may, for example, decrease a critical value 610 of the first similar word "NDC" from 4300 to 4000 and increase a critical value 620 of the second similar word of "MDC" set as the target word 510 from 3600 to 3800.

However, the example embodiment is not limited thereto. In response to the second similar word of "MDC" set as the target word 510 being selected, the display apparatus 100 may decrease the critical value 620, that is, 3600, of the second similar word of "MDC" set as the target word 510, by a predetermined adjustment value.

As described above, the display apparatus 100 may decrease or increase the critical value assigned to each of the plurality of similar words recognized from the user's uttered voice based on the selection command of the user. Accordingly, in response to a user's uttered voice which is similar to or the same as the uttered voice being received, the display apparatus 100 may set a target word by using the adjusted critical value of each of the plurality of similar words extracted in connection with the user's uttered voice, thereby improving the recognition rate on the user's uttered voice.

As above, the operation of performing the voice recognition with respect to a user's uttered voice in the display apparatus 100 has been described. A method for recognizing a user's uttered voice in the display apparatus 100 will be described in detail below.

Figure 7:
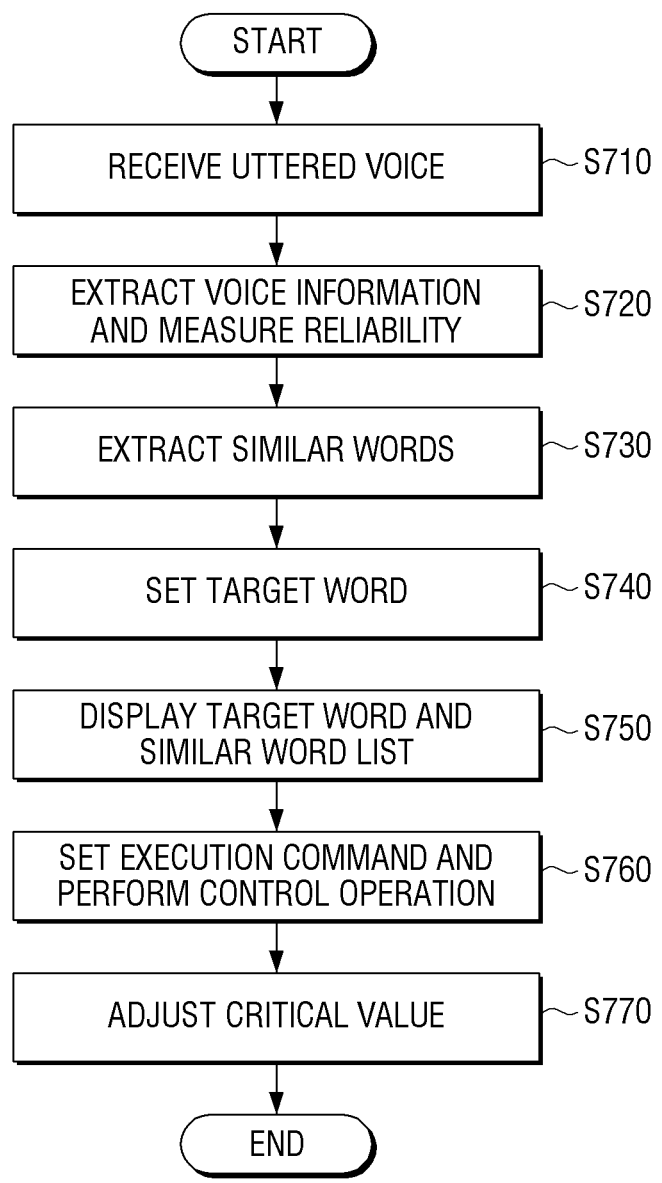
FIG. 7 is a flowchart illustrating a method for recognizing a user's uttered voice in a display apparatus according to an example embodiment.

FIG. 7 is a flowchart illustrating a method for recognizing a user's uttered voice in a display apparatus according to an example embodiment.

As illustrated in FIG. 7, in response to a user's uttered voice being received through a remote controller (not shown) or a microphone of the display apparatus 100, the display apparatus 100 extracts voice information from the received uttered voice and measures the reliability with respect to a plurality of pre-registered words based on the extracted voice information (S710, S720). Subsequently, the display apparatus 100 extracts a plurality of similar words which are similar to the user's uttered voice based on the measured reliability (S730).

For example, the display apparatus 100 may convert a voice signal regarding the received uttered voice into a voice signal in a digital form and convert the voice signal in the digital form into text by using the STT algorithm. Subsequently, the display apparatus 100 may extract a pronunciation from the text regarding the user's uttered voice, measure the similarity between the extracted pronunciation and a pronunciation of each of the plurality of pre-registered words, and determine a reliability value based on the similarity.

According to an example embodiment, the display apparatus 100 may measure the similarity between the pronunciation with respect to the user's uttered voice and the pronunciation of each of the plurality of pre-registered words and determine the reliability value by using the similarity algorithm such as, for example, a Confusion Matrix.

In response to the reliability value of each of the plurality of words being determined, the display apparatus 100 may extract a plurality of similar words which are similar to the user's uttered voice based on the determined reliability value. In this case, when the plurality of similar words which are similar to the user's uttered voice are extracted, it is preferred to group the plurality of extracted similar words into a similar word group. The display apparatus 100 determines whether the plurality of the extracted similar words are grouped into a similar word group. In response to determining that at least one similar word among the plurality of extracted similar words is grouped into a similar word group, the display apparatus 100 may extract the other words in the similar word group as a similar word related to the user's uttered voice.

In response to the plurality of similar words being extracted, the display apparatus 100 sets a similar word which satisfies a predetermined condition from among the plurality of extracted similar words as a target word (S740). Subsequently, the display apparatus 100 displays the similar word set as the target word and a similar word list including the other similar words (S750).

While the target word and the similar word list are displayed, the display apparatus 100 sets the similar word set as the target word or at least one similar word included in the similar word list as an execution command according to a selection command of a user (S760). According to an example embodiment, in response to an execution command of the user not being received for a predetermined critical time or in response to a selection command with respect to the target word not being received, the display apparatus 100 may set the similar word set as the target word as an execution command. In addition, in response to a selection command with respect to the similar word list being received, the display apparatus 100 may set a similar word corresponding to the selection command from among the plurality of similar words included in the similar word list as an execution command.

The similar word list is a list including similar words other than the target word and different symbolic letters being matched with the other similar words. In response to a selection command of the user being an uttered voice related to a symbolic letter, the display apparatus 100 may set a similar word which is matched with the symbolic letter similar to the uttered voice from among the similar words in the similar word list as an execution command.

In response to the execution command being set, the display apparatus 100 adjusts a critical value assigned to the similar word set as the execution command from among the plurality of similar words including the target word (S770). That is, according to an example embodiment, the display apparatus 100 may set a target word with respect to the user's uttered voice by using the adjusted critical value of each of the similar words in a voice recognition process, thereby improving a voice recognition rate on the user's uttered voice.

A method for setting a target word from a plurality of similar words extracted in connection with a user's uttered voice in the display apparatus 100 will be described in detail below.

Figure 8:
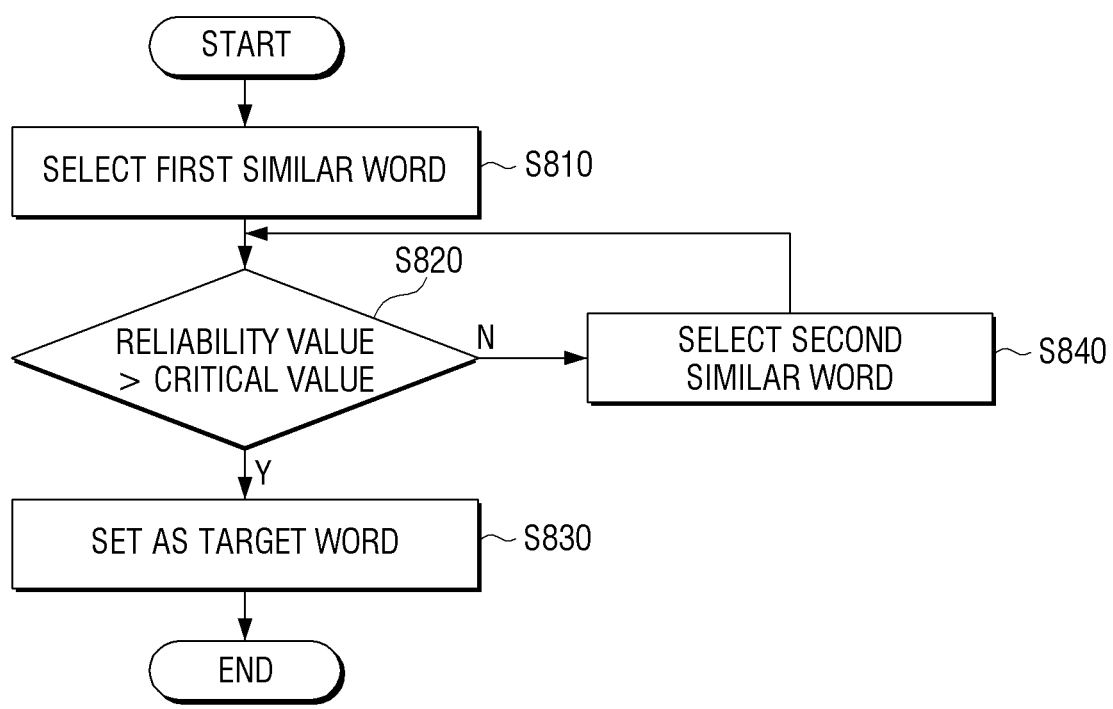
FIG. 8 is a flowchart illustrating a method for setting a target word in a display apparatus according to an example embodiment.

FIG. 8 is a flowchart illustrating a method for setting a target word in a display apparatus according to an example embodiment.

As illustrated in FIG. 8, in response to a plurality of similar words which are similar to a user's uttered voice being extracted, the display apparatus 100 selects a first similar word having the highest reliability value from among the plurality of extracted similar words (S810). Subsequently, the display apparatus 100 compares the reliability value of the first similar word with a critical value assigned to the first similar word (S820). In response to determining that the reliability value of the first similar word is higher than the predetermined critical value of the first similar word, the display apparatus 100 sets the first similar word as a target word which is the most similar to the user's uttered voice and includes the other similar words in a similar word list (S830). Meanwhile, in response to the reliability value of the first similar word being lower than the predetermined critical value of the first similar word, the display apparatus 100 performs the operations at S820 and S830 again to select a second similar word having the second highest reliability value and compares the reliability value of the second similar word with a critical value assigned to the second similar word (S840). In response to the reliability value of the second similar word being higher than the predetermined critical value of the second similar word, the display apparatus 100 sets the second similar word as the target word. According to the operations, the display apparatus 100 may compare the critical values assigned to each of the plurality of similar words, from a similar word having the highest reliability value among the plurality of similar words extracted in connection with the user's uttered voice, and set a similar word having a reliability value higher than the critical value as the target word.

Figure 9:
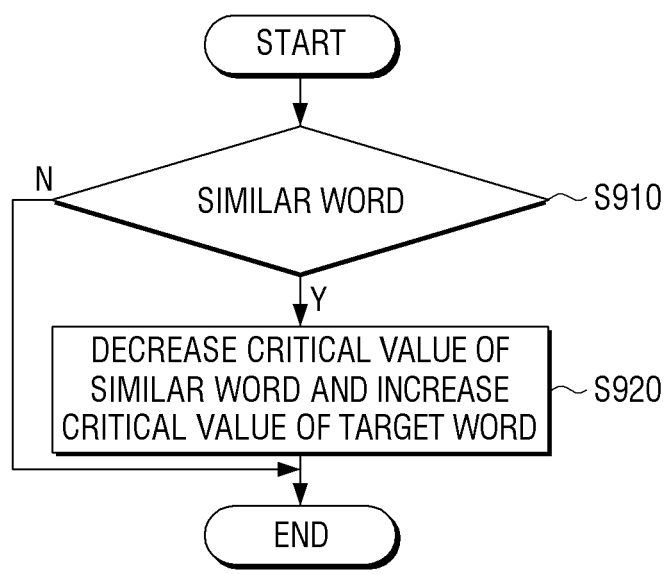
FIG. 9 is a flowchart illustrating a method for adjusting a critical value of a similar word in a display apparatus according to an example embodiment.

FIG. 9 is a flowchart illustrating a method for adjusting a critical value of a similar word in a display apparatus according to an example embodiment.

As illustrated in FIG. 9, the display apparatus 100 determines whether at least one similar word among a plurality of similar words included in a similar word list is set as an execution command (S910). In response to determining that the similar word included in the similar word list is set as the execution command, the display apparatus 100 decreases a critical value of the similar word set as the execution command by a predetermined adjustment value and increases a critical value of the similar word set as a target word by the predetermined adjustment value (S920).

The example embodiment is not limited thereto. That is, in response to a similar word set as an initial target word being set as an execution command, the display apparatus 100 may decrease a critical value of the similar word set as the target word by a predetermined adjustment value.

As described above, the display apparatus 100 according to an example embodiment may set a target word with respect to a user's uttered voice by using the adjusted critical value of the similar words in a voice recognition process, thereby enhancing the voice recognition rate on the user's uttered voice.

As above, the example embodiments of the disclosure have been described.

The foregoing example embodiments and advantages are merely examples and are not to be construed as limiting. The disclosure can be readily applied to other types of devices. Also, the description of the example embodiments is intended to be illustrative, and not to limit the scope of the claims, and many alternatives, modifications, and variations will be apparent to those skilled in the art.

What is claimed is:

1. A method for performing voice recognition in a display apparatus, comprising:
   receiving an uttered voice of a user;
   extracting voice information from the uttered voice and comparing the voice information to information associated with words in a pronunciation dictionary;
   based on reliabilities associated with the comparing, determining similar words which are similar to words in the uttered voice;
   setting, as a target word with respect to the uttered voice, a similar word satisfying a predetermined condition;
   displaying one or both of the target word and a similar word list including one or more of the similar words other than the target word;
   setting an execution command; and
   adjusting a critical value assigned to the similar word set as the execution command from among the plurality of similar words including the target word,
   wherein, in response to an execution command not being received for a predetermined critical time or in response to a selection command with respect to the target word being received, setting the execution command comprises setting the target word as the execution command.

2. The method as claimed in claim 1, wherein the voice information comprises pronunciation information of text converted through voice recognition of the uttered voice.

3. The method as claimed in claim 2,
   wherein setting the similar word satisfying the predetermined condition comprises comparing a reliability value for each of the plurality of similar words and a critical value for each of the similar words and setting a similar word having a reliability value higher than the critical value for each of the similar words as the target word.

4. The method as claimed in claim 1,
   wherein, in response to a selection command with respect to the similar word list being received, setting the execution command comprises setting a similar word corresponding to the selection command as the execution command.

5. The method as claimed in claim 4, wherein the similar word list comprises a list including similar words other than the target word and different symbolic letters being matched with the other similar words,
   wherein, in response to the selection command being an uttered voice related to a symbolic letter, setting the execution command comprises setting a similar word which is matched to correspond with a symbolic letter similar to the uttered voice from among the similar words in the similar word list as the execution command.

6. The method as claimed in claim 1, wherein, in response to the target word being set as the execution command, adjusting the critical value comprises decreasing a critical value of the similar word set as the target word by a predetermined adjustment value.

7. The method as claimed in claim 1, wherein, in response to a similar word included in the similar word list being set as an execution command, adjusting the critical value comprises decreasing a critical value of the similar word set as the execution command by a first adjustment value and increasing a critical value of the similar word set as the target word by a second adjustment value.

8. The method as claimed in claim 1, wherein, in response to the plurality of similar words which are similar to the uttered voice being determined, grouping the plurality of determined similar words into a similar word group.

9. The method as claimed in claim 8, wherein, in response to the similar words being grouped into a similar word group, determining all words in the similar word group as a similar word related to the uttered voice.

10. A display apparatus comprising:
    an input unit configured to receive an uttered voice of a user;
    a display configured to display a voice recognition result of the uttered voice;
    a voice processor configured to extract voice information from the uttered voice, compare the voice information to information associated with words in a pronunciation dictionary, and, based on reliabilities associated with the comparing, determine similar words which are similar to words in the uttered voice; and
    a controller configured to set, as a target word with respect to the uttered voice, a word satisfying a predetermined condition, control the display to display one or both of the target word and a similar word list including one or more of the similar words other than the target word, set an execution command, and adjust a critical value assigned to the similar word set as the execution command from among the plurality of similar words including the target word,
    wherein, in response to an execution command not being received for a predetermined critical time or in response to a selection command with respect to the target word being received, setting the execution command comprises setting the target word as the execution command.

11. The apparatus as claimed in claim 10, wherein the voice information comprises pronunciation information on text converted through voice recognition on the uttered voice.

12. The apparatus as claimed in claim 11,
    wherein the controller is configured to compare a reliability value for each of the plurality of similar words and a critical value assigned to each of the similar words and to set a similar word having a reliability value higher than the critical value assigned to each of the similar words as the target word.

13. The apparatus as claimed in claim 10, wherein the controller is configured to set a similar word corresponding to the selection command as the execution command in response to a selection command with respect to the similar word list being received.

14. The method as claimed in claim 13, wherein the similar word list comprises a list including similar words other than the target word and different symbolic letters being matched with the other similar words,
   wherein the controller is configured to set a similar word which is matched with a symbolic letter similar to the uttered voice from among the similar words in the similar word list as the execution command in response to the selection command being an uttered voice related to a symbolic letter.

15. The apparatus as claimed in claim 10, wherein the controller is configured to decrease a critical value of the similar word set as the target word by a predetermined adjustment value in response to the target word being set as an execution command.

16. The apparatus as claimed in claim 10, wherein the controller is configured to decrease a critical value of the similar word set as the execution command by a first adjustment value and to increase a critical value of the similar word set as the target word by a second adjustment value in response to a similar word included in the similar word list being set as an execution command.

17. The apparatus as claimed in claim 10, wherein the controller is configured to group the plurality of similar words into a similar word group in response to the plurality of similar words which are similar to the uttered voice being determined.

18. The apparatus as claimed in claim 10, wherein the voice processor is configured to determine all words in the similar word group as a similar word related to the uttered voice in response to the similar words determined in connection with the uttered voice being grouped into a similar word group.

19. A display apparatus comprising:
   a microphone configured to receive a uttered voice of a user;
   a display; and
   processing circuitry configured to at least:
   extract voice information from the uttered voice;
   compare the voice information to information associated with words in a pronunciation dictionary;
   based on reliabilities associated with the comparing, determine similar words which are similar to words in the uttered voice;
   set, as a target word with respect to the uttered voice, a word satisfying a predetermined condition;
   control the display to display one or both of the target word and a similar word list including one or more of the similar words other than the target word;
   set an execution command; and
   adjust a critical value assigned to the similar word set as the execution command from among the plurality of similar words including the target word,
   wherein, in response to an execution command not being received for a predetermined time or in response to a selection command with respect to the target word being received, setting the execution command comprises setting the target word as an execution command.

* * * * *